United States Patent [19]

Hartmann et al.

[11] 4,201,467
[45] May 6, 1980

[54] GAS VELOCITY METER

[75] Inventors: Klaus Hartmann, München; Wolfgang Siersch, Taufkirchen, both of Fed. Rep. of Germany

[73] Assignee: Erwin Sick Gesellschaft mit beschrankter Haftung Optik-Elektronik, Waldkirch, Fed. Rep. of Germany

[21] Appl. No.: 829,469

[22] Filed: Aug. 31, 1977

[30] Foreign Application Priority Data

Sep. 28, 1976 [DE] Fed. Rep. of Germany ....... 2643616

[51] Int. Cl.² ........................... G01P 3/36; G01F 1/00
[52] U.S. Cl. ..................................... 356/28; 73/194 E
[58] Field of Search ................. 356/28, 103; 73/194 E

[56] References Cited

U.S. PATENT DOCUMENTS

| | | | |
|---|---|---|---|
| 2,769,492 | 11/1956 | Ostergren et al. | 356/28 |
| 3,413,850 | 12/1968 | Merrifield | 356/28 |
| 3,558,898 | 1/1971 | Block et al. | 356/28 |
| 3,799,671 | 3/1974 | Schweizer | 356/28 |
| 3,804,517 | 4/1974 | Meyr et al. | 356/28 |
| 3,832,059 | 8/1974 | Iten | 356/28 |

FOREIGN PATENT DOCUMENTS 2126859  5/1970  Fed. Rep. of Germany ............ 356/28

OTHER PUBLICATIONS

V.O. Petrak et al., Experimental-Technik der Physik, XXII, 1974, vol. 6, pp. 605–612.

*Primary Examiner*—S. C. Buczinski

[57] ABSTRACT

A flow velocity meter is described suitable for measuring the mean flow velocity of a medium flowing along a duct using optical means which generates first and second beams of light each in the form of a relatively shallow wide band which traverse the duct across first and second spaced apart transverse planes which are arranged substantially at right angles to the mean flow direction. Light beams emerging from the duct are received on respective photoelectric detectors the output signals of which are essentially identical but relatively displaced because of the time required for the medium to flow between the two planes. By processing the signals in a correlation circuit this time is established and is used to produce an output proportional to the mean flow velocity of the medium between the two planes. The correlation circuit used is based on digital techniques.

20 Claims, 5 Drawing Figures

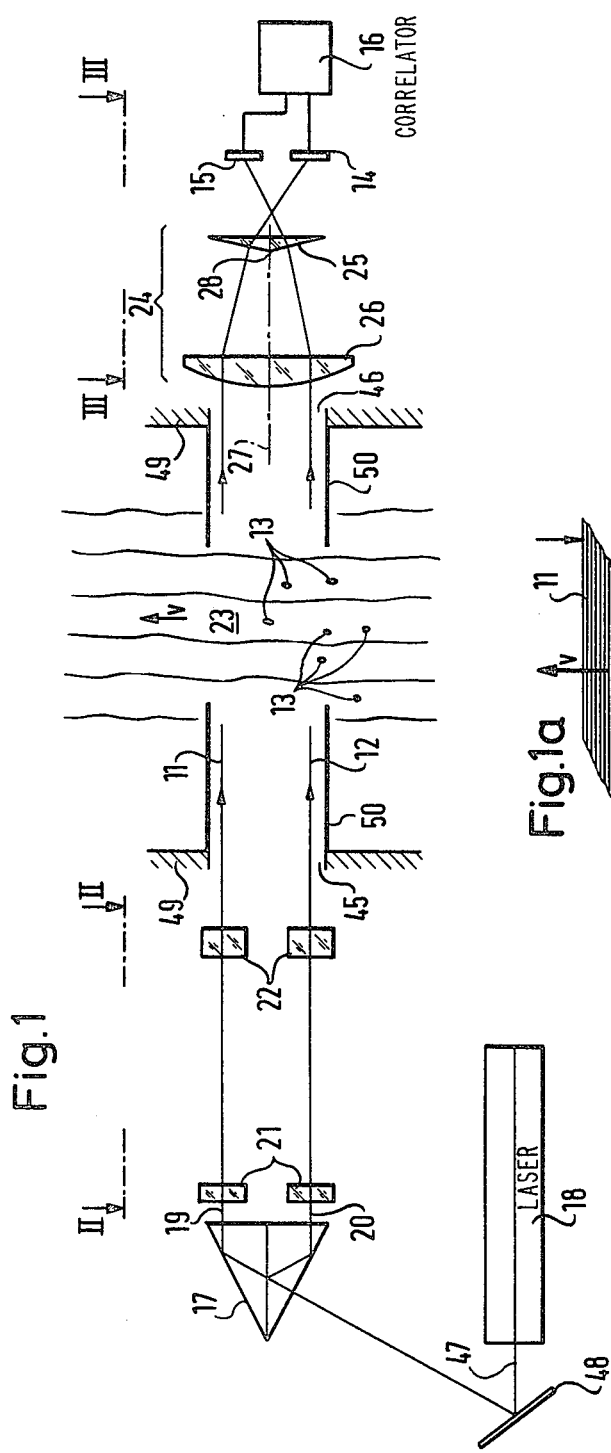

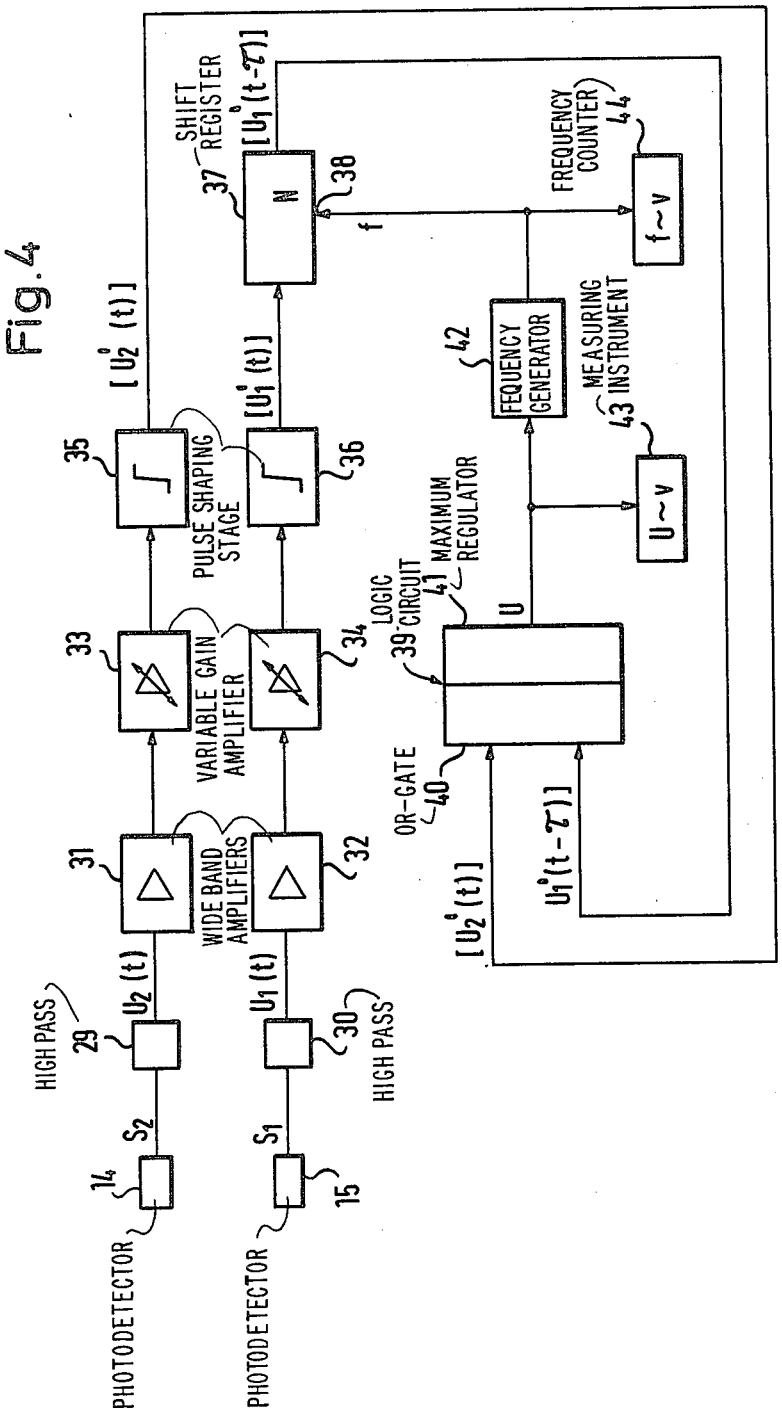

GAS VELOCITY METER

BACKGROUND OF THE INVENTION

The present invention relates to a gas velocity meter, particularly for measuring the velocity of flue gases in a smokestack.

It has hitherto been conventional to measure the velocity of a gas flow, particularly in a smokestack, by point-by-point measurement using probes inserted in the stack, whereby preferance has been given to the use of the dynamic pressure principle.

BRIEF SUMMARY OF THE INVENTION

The problem of the present invention is to provide a gas velocity meter of the type indicated hereinbefore which makes it possible to perform a very accurate and continuous measurement of the velocity of a gas, particularly a flue gas. In particular the measurement is to take place in an integral manner over the entire cross-section of the gas flow or the stack cross-section.

According to the invention this problem is solved in that a thin light band extends in the direction of the gas flow along each of two planes, through which successively pass the individual gas particles, said light band being directed to a photodetector, whilst the output signals of the two photodetectors are fed to a correlator which determines the transit time difference of the two output signals. As a result of this construction scattering and absorption losses on the particles carried along in the gas flow lead to a modulation of the two transmission signals whose transit time difference is investigated in the correlator.

Preferably a light dispersing apparatus disperses the light coming from a light source, particularly a laser, into two partial beams. In order to obtain a high degree of measuring precision it is important that a very thin measuring beam is used. The light dispersing apparatus is advantageously a Köster's biprism.

According to a particularly advantageous embodiment cylindrical lenses whose axes are optically parallel to the gas flow direction are arranged in each of the two partial beams and extend these to flat superimposed light bands. As a result the necessary high measuring precision is obtained, together with an integration over the gas flow and/or smokestack cross-section. In order to eliminate the influence of the marginal area when there are particle velocity profiles the flanges can be extended in to the stack until they pass through the marginal zone.

Preferably two cylindrical lenses are located in each optical path and together they form an afocal system.

An optical image production device is advantageously provided at the end of the measuring section and said device permits the concentration of the two light bands onto in each case one photodetector. The image production device preferably has a lens common to both light bands, whereby the focus of the lens is located in the photodetector plane. Measures are provided for separating the beam so that the two different beams are directed onto the different photodetectors. The beam separation measures preferably comprise the arrangement of an optical wedge in one of the two beams between the lens and the photodetector. Advantageously a double wedge is arranged symmetrically to the optical axis and its roof extends in perpendicular direction to the optical axis and parallel to the plane of the light bands. In principle other beam separation methods are possible. For example individual cylindrical lenses could be provided for each light band, in the same way as the lenses provided at the inlet.

The two photodetectors are advantageously provided on either side of the optical axis in the same plane and very close to one another, so that environmental influences will have the same action on both photodetectors and will not therefore lead to errors.

Each of the two photodetectors is advantageously connected via a high-pass to a wide band amplifier. As a result the constant light component contained in the output signals of the two photoelectric cells is separated and only signals corresponding to the concentration fluctuations of the traversing cloud of particles are processed in the following circuit.

Advantageously the wide band amplifiers are followed in each case by a variable-gain amplifier in which the signals are standardized to evaluatable amplitudes.

Subsequently a pulse shaping stage is provided for each photodetector and said stage quantizes the analog signals applied. Quantization takes place to one bit, so that cross correlation can be performed in simple manner as so-called polarity correlation with digital pulses.

The time-leading signal is preferably applied to a shift register where it is retarded. The clock frequency and number of shift register stages are advantageously matched to the velocity range to be measured and the consequently necessary delay time.

According to a further construction the shift register has a control input for regulating the delay time to which is supplied a signal for varying the delay time and which is representative of the transit time difference. Thus, a control loop is obtained which is automatically adjusted to the sought state transit time difference=-delay time.

For the formation of the control signal the delayed and undelayed signal is advantageously applied to a logic circuit, which substantially comprises an exclusive OR-gate.

The logic circuit can also contain a maximum regulator which receives the output signals of the OR-gate and controls a voltage to frequency converter, which is connected to the control input of the shift register. An analog indicator can be connected to the maximum regulator output and a digital indicator can be connected to the voltage to frequency converter output.

BRIEF DESCRIPTION OF THE DRAWINGS

The invention is explained in a non-limitative manner relative to embodiments and with reference to the drawings, wherein show:

FIG. 1. A diagrammatic, partly cutaway side view of a velocity meter according to the invention for measuring the velocity of flue gases in a smokestack.

FIG. 1a. A perspective view of the light bands in the measuring section.

FIG. 2. A view along the line II—II of FIG. 1.

FIG. 3. A view along the line III—III of FIG. 1.

FIG. 4. A block diagram of the gas velocity meter according to the invention.

DETAILED DESCRIPTION OF THE PREFERRED EMBODIMENTS

According to FIG. 1 a laser 18 transmits a fine light beam 47 via a plane deviating mirror 48 to a Köster's biprism 17, which splits up the incident light beam into two parallel and well spaced partial beams 19, 20. According to FIGS. 1 and 2 the light beams 19, 20 pass through a cylindrical lens system, which comprises a first strongly refractive cylindrical lens 21 and a further cylindrical lens 22 with a greater focal length and larger dimensions. Cylindrical lenses 21, 22 form an afocal system, so that the initially very fine light beam 19 or 20 according to FIG. 2 is widened to form a substantially parallel thin light band 11 or 12. The two light bands 11, 12 pass through a lateral opening 45 into a smokestack 49. They pass through the actual measuring section 23 through which gas and smoke particles 13 rise upwards at an average velocity v and cause absorption and scattering losses.

On the opposite side of stack 49 light bands 11, 12 pass out of the same through an opening 46.

In order to eliminate the influence of the marginal zones tunnel-shaped attachments 50 extend inwards from the wall of stack 49 up to the actual measuring section 23.

The light bands 11, 12 which pass out of stack 49 are concentrated by an image production apparatus 24 onto in each case one associated photodetector 14 or 15. Device 24 comprises a normal lens 26, whose focus is in the plane of photodetector 14, 15. A double wedge 25 with roof 28 arranged on the optical axis 27 deviates the two convergent light bands in the manner shown in such a way that light band 11 is concentrated exclusively onto photodetector 14 and light band 12 exclusively onto photodetector 15.

FIG. 3 shows the action of lens 26 and double wedge 25 in the view III—III of FIG. 1.

The two photodetectors 14, 15 are connected to a correlator 16, which investigates the transit time difference of the two signals received by photodetectors 14, 15. If the spacing of the two light bands 11, 12 within measuring section 23 is designated by a (FIG. 1a) and $\tau$ is the transit time difference the velocity of the flue gas flow integrated over the stack cross-section or the cross-section of the measuring section can be represented as follows:

$$v = a/\tau \quad (1)$$

FIG. 4 shows a preferred block diagram of a correlator 16 suitable for the invention. The output signals of the two photoelectric cells 14, 15 are essentially identical, other than for the transit time difference $\tau$. The output signals can be separated into two portions in the following manner:

$$S_1(t) = U_1(t) + n(t) \quad (2)$$

$$S_2(t) = U_2(t) + n(t) \quad (3)$$

The quantity n (t) corresponds to the fundamental transmission of the gas flow, whilst portions $U_1$ (t) and $U_2$ (t) describe the concentration fluctuations of the clouds of particles which pass through. The signal portions $U_i$ (t) and n (t) differ significantly as regards their time behaviour. Relative to U (t) the basic level n (t) can virtually be considered as a constant component. By switching in high passes 29, 30 in the manner shown in FIG. 4 the level n (t) is separated and the subsequent correlation analysis relates only to the alternating component $U_i$ (t).

According to FIG. 4 signals $U_1$ (t) and $U_2$ (t) are applied to the wide band amplifiers 32 or 31, where they are pre-amplified in wide band manner and in a following variable gain amplifier 33 or 34 are standardized to evaluatable amplitudes.

Cross correlation can be performed in simple manner as so-called polarity correlation with digital pulses. For this purpose the analog signals are initially quantized to one bit in in each case one pulse shaping stage 35 or 36. The time-leading signal, derived from photodetector 15 is subsequently delayed in a shift register 37. The clock frequency f and the number of stages N of shift register 37 are matched to the expected gas velocities and consequently to the necessary time lags. In stages 35/36 a digital signal $U'_i(t)$ is obtained from analog signal $U_i(t)$. In the case of one bit quantization only two states are possible for digital signal $U'_i(t)$ which are called 0 and 1 (or + and −).

Thus, a time-delayed signal $U'_1$ (t−$\tau$) is obtained from shift register 37 and this signal and the undelayed signal $U'_2$ (t) are applied to the two inputs of a logic circuit 39 which substantially comprises an exclusive OR-gate 40. Gate 40 investigates the state of two digital signals with regard to their equality and emits a corresponding output signal. The output signal has a maximum value when the delay in the shift register corresponds to the transit time difference between both signals. Logic circuit 39 also contains a maximum regulator 41 which receives the output signals of the exclusive OR-gate 40 and controls a voltage to frequency converter 42 whose output is supplied to the control input 38 of shift register 37, which causes the closing of the control loop and the time lag of shift register 37 is automatically adjusted to the existing transit time difference.

The velocity can now be determined in the following manner:

Transit time difference:

$$\tau = a/v \quad (4)$$

Time lag:

$$t = N/f \quad (5)$$

Thus, in the regulated state the clock frequency f of shift register 37 is a direct measure for the flue gas velocity v according to the following equation:

$$f = N/a \cdot v. \quad (6)$$

When the shift register 37 is constructed with preferably 480 positions and a clock frequency range of 360 Hz to 360 kHz it is possible to cover the velocity range of 3 cm/sec to 30 m/sec which is of interest for flue gas measurements if the distance between the light bands 11, 12 is 40 mm.

Indication of the measured value can take place either in analog manner via the output voltage U of the maximum regulator at a measuring instrument 43 and in digital manner via a simple frequency counter 44 at the output of the voltage-controlled frequency generator 42.

The invention is not limited to the embodiments described and represented hereinbefore and various modifications can be made thereto without passing beyond the scope of the invention.

What is claimed is:

1. A flow velocity meter, suitable for measuring the mean flow velocity of a medium flowing along a duct and comprising means for generating first and second beams of light each having the form of a relatively shallow relatively wide band with a relatively regularly disbributed light flux and for directing said beams of light along respective first and second spaced apart planes lying tranversely of the duct and substantially at right angles to the mean flow direction, means for ensuring that each of said beams intercepts a cross section of the medium flowing through the duct representative of the mean flow velocity of same through the duct, first and second photodetectors disposed to receive said beams respectively, after said beams have traversed their respective transverse planes, and correlator means arranged to receive output signals from said first and second photodetectors representative of the instantaneous flows through said transverse planes for determining the transit time of said medium therebetween.

2. A meter according to claim 1 wherein the means for dispersing light comprises a light dispersing apparatus which disperses the light from a laser light source into two parallel beams.

3. A meter according to claim 2, wherein the light dispersing apparatus is a Koster's biprism.

4. A meter according to claim 2, wherein cylindrical lenses whose axes are optically parallel to the gas flow direction are arranged in each of the two parallel beams and extend them to form flat superimposed light bands.

5. A meter according to claim 4, wherein two cylindrical lenses which together form an afocal system are located in each optical path.

6. A meter according to claim 1, wherein an optical image production device is provided by means of which each of the two light bands is concentrated onto a photodetector, respectively.

7. A meter according to claim 6, wherein the image production device has a lens common to both light bands, the focus of said lens being located in the plane of the photodetectors, further means being provided for separation of said light beams.

8. A meter according to claim 7, wherein the beam separating means comprise at least one optical wedge in one of the beams between the lens and the photodetectors.

9. A meter according to claim 8, wherein a double wedge is arranged symmetrically to the optical axis and its roof extends in perpendicular manner to the optical axis and parallel to the plane of the light bands.

10. A meter according to claim 1, wherein the two photodetectors are arranged symmetrically on either side of the optical axis in the same plane.

11. A meter according to claim 1, wherein the two photodetectors are connected respectively to wide band amplifiers via a high pass.

12. A meter according to claim 11, wherein a variable gain amplifier follows each of the wide band amplifiers.

13. A meter according to claim 11, wherein a pulse shaping stage is provided for each photodetector and in said stage the analog signals applied are polarity-quantized.

14. A meter according to claim 13, wherein a time-leading signal is applied to a shift register where it is delayed.

15. A meter according to claim 14, wherein the clock frequency and number of stages of the shift register are matched to the velocity range to be measured.

16. A meter according to claim 14, wherein the shift register has a control input for regulating the time lag to which is supplied a signal for varying the time lag and which is representative of the transit time difference.

17. A meter according to claim 16, wherein the delayed and undelayed signals, are applied to a logic circuit which substantially comprises an exclusive OR-gate.

18. A meter according to claim 17, wherein the logic circuit contains a maximum regulator which receives the output signals of the OR-gate and controls a voltage to frequency converter which is connected to the control input.

19. A meter according to claim 18, wherein an analog indicator is connected to the output of the maximum regulator and a digital indicator is connected to the output of the voltage to frequency converter.

20. A meter according to claim 1, wherein tunnel-shaped attachments project from two openings provided into the duct.

* * * * *